(12) United States Patent  (10) Patent No.: US 9,287,722 B2
Williams et al.  (45) Date of Patent: Mar. 15, 2016

(54) PERSONAL E-PORT APPARATUS

(71) Applicants: Donald S. Williams, Chicago, IL (US); Thomas J. Rieckelman, Chicago, IL (US)

(72) Inventors: Donald S. Williams, Chicago, IL (US); Thomas J. Rieckelman, Chicago, IL (US)

( * ) Notice: Subject to any disclaimer, the term of this patent is extended or adjusted under 35 U.S.C. 154(b) by 218 days.

(21) Appl. No.: 14/208,949

(22) Filed: Mar. 13, 2014

(65) Prior Publication Data

US 2014/0274204 A1 Sep. 18, 2014

Related U.S. Application Data

(60) Provisional application No. 61/787,904, filed on Mar. 15, 2013.

(51) Int. Cl.
*H02J 7/00* (2006.01)
*H04B 1/3827* (2015.01)
*H04B 1/3877* (2015.01)
*H04B 1/3888* (2015.01)

(52) U.S. Cl.
CPC .............. *H02J 7/0013* (2013.01); *H04B 1/385* (2013.01); *H04B 1/3827* (2013.01); *H04B 1/3877* (2013.01); *H04B 1/3888* (2013.01); *H02J 7/0044* (2013.01)

(58) Field of Classification Search
CPC ...... Y02E 60/12; H02J 7/0044; H02J 7/0042; H02J 7/0045; H01M 2/1022
USPC ........................................................ 320/114
See application file for complete search history.

(56) References Cited

U.S. PATENT DOCUMENTS

| 7,772,802 | B2 | 8/2010 | Manico et al. |
| 7,793,121 | B2 | 9/2010 | Lawther et al. |
| 7,948,208 | B2 | 5/2011 | Partovi et al. |
| 7,948,209 | B2 | 5/2011 | Jung |
| 7,952,322 | B2 | 5/2011 | Partovi et al. |
| 8,030,888 | B2 | 10/2011 | Pandya et al. |
| 8,102,147 | B2 | 1/2012 | Jung |
| 8,120,317 | B2 | 2/2012 | Sip |
| 8,169,185 | B2 | 5/2012 | Partovi et al. |
| 8,193,764 | B2 | 6/2012 | Jakubowski |
| 8,242,741 | B2 | 8/2012 | Phelps, III |
| 8,248,026 | B2 | 8/2012 | Sip |
| 8,463,765 | B2 | 6/2013 | Lesavich |
| RE44,713 | E | 1/2014 | Jung |
| 8,629,652 | B2 | 1/2014 | Partovi et al. |
| 8,629,654 | B2 | 1/2014 | Partovi et al. |
| 8,655,272 | B2 | 2/2014 | Saunamaki |
| 8,656,193 | B2 | 2/2014 | Hijazi et al. |
| 8,854,207 | B2 | 10/2014 | Williams |
| 9,013,301 | B2 | 4/2015 | Williams |
| 9,037,564 | B2 | 5/2015 | Lesavich et al. |
| 9,137,250 | B2 | 9/2015 | Lesavich et al. |
| 2005/0086389 | A1* | 4/2005 | Chang ................... H04W 88/02 709/250 |
| 2007/0182367 | A1 | 8/2007 | Partovi |
| 2007/0279002 | A1 | 12/2007 | Partovi |
| 2008/0055076 | A1* | 3/2008 | Yu .......................... G08B 1/08 340/539.23 |
| 2009/0021214 | A1* | 1/2009 | Foster ................. H01M 10/465 320/114 |
| 2009/0096413 | A1 | 4/2009 | Partovi |

(Continued)

*Primary Examiner* — Arun Williams
(74) *Attorney, Agent, or Firm* — Lesavich High-Tech Law Group, S.C.; Stephen Lesavich

(57) ABSTRACT

A persona e-port apparatus. The personal e-port apparatus includes a portable apparatus such as bag, purse, backpack, etc. with specific portions for protecting, organizing displaying and charging plural electronic devices such as smart phones, book readers, game consoles and tablet computers.

21 Claims, 3 Drawing Sheets

(56) References Cited

U.S. PATENT DOCUMENTS

| | | |
|---|---|---|
| 2010/0201533 A1 | 8/2010 | Kirby et al. |
| 2010/0213895 A1 | 8/2010 | Keating |
| 2011/0208710 A1 | 8/2011 | Lesavich |
| 2011/0221385 A1 | 9/2011 | Partovi |
| 2012/0043937 A1* | 2/2012 | Williams ............ H02J 7/0044 320/115 |
| 2012/0126745 A1 | 5/2012 | Partovi |
| 2012/0235636 A1 | 9/2012 | Partovi |
| 2012/0256585 A1 | 10/2012 | Partovi |
| 2012/0278622 A1 | 11/2012 | Lesavich et al. |
| 2013/0099563 A1 | 4/2013 | Partovi |
| 2013/0175983 A1 | 7/2013 | Partovi |
| 2013/0214931 A1* | 8/2013 | Chia ............ H02J 7/0042 340/815.4 |
| 2013/0285604 A1 | 10/2013 | Partovi |
| 2013/0217332 A1 | 11/2013 | Altman et al. |
| 2014/0000322 A1 | 1/2014 | Williams |
| 2014/0103873 A1 | 4/2014 | Partovi |
| 2014/0189792 A1 | 7/2014 | Lesavich et al. |
| 2014/0274204 A1 | 9/2014 | Williams |
| 2015/0020558 A1 | 1/2015 | Williams |

* cited by examiner

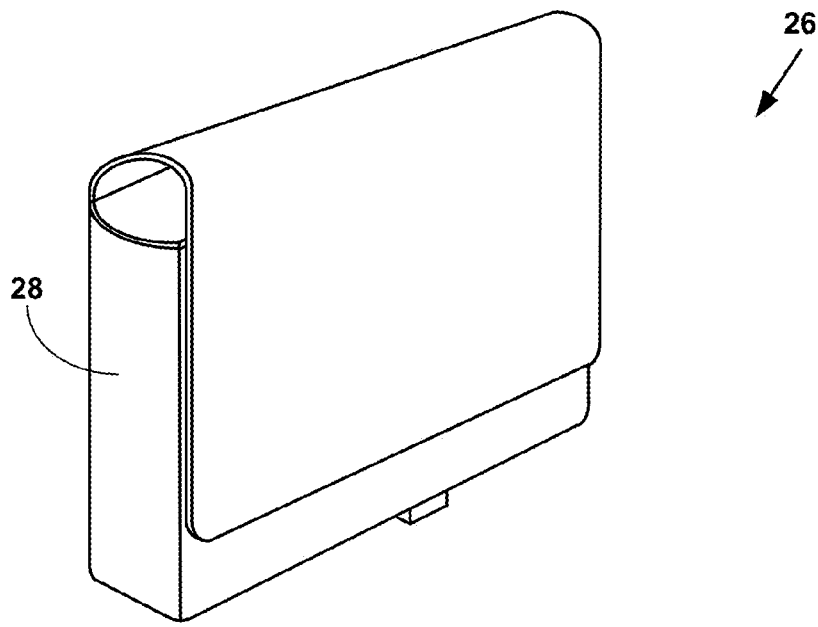
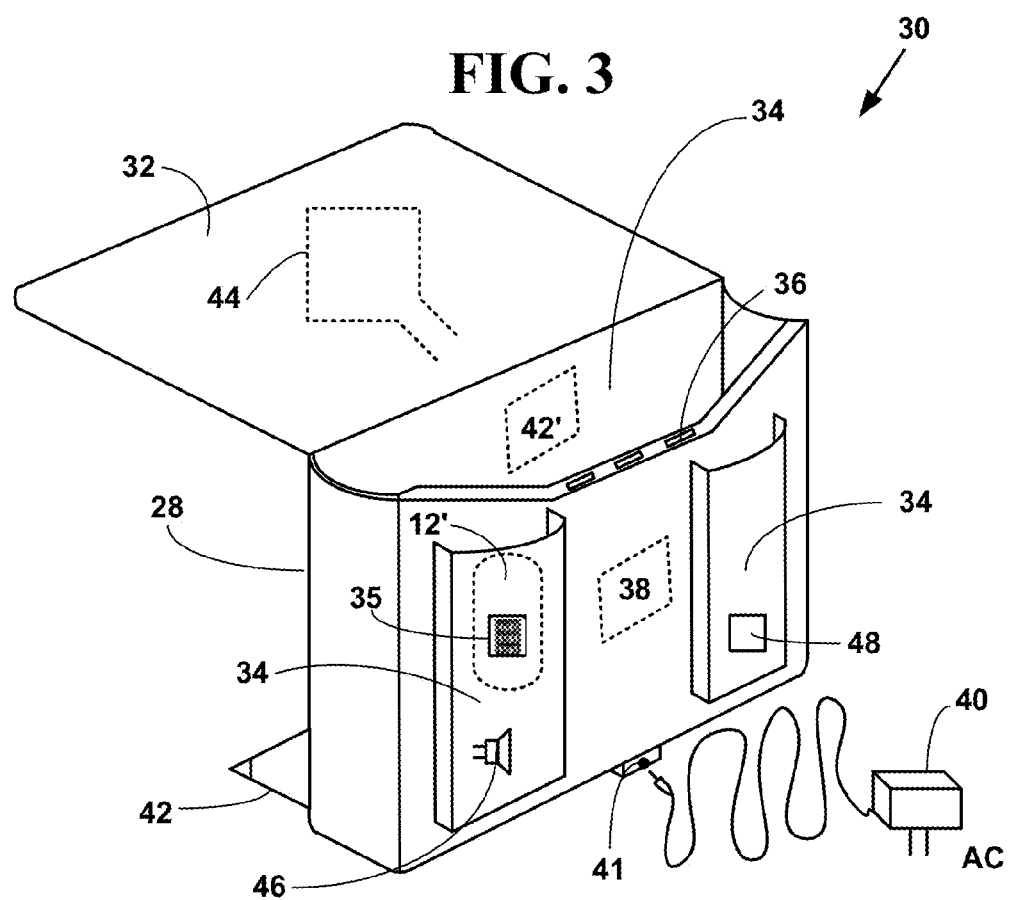

PERSONAL E-PORT APPARATUS

CROSS REFERENCES TO RELATED APPLICATIONS

This utility application claims priority to U.S. Provisional Application No. 61/787,904, filed, Mar. 15, 2013, the contents of which is incorporated by reference.

FIELD OF INVENTION

This application relates to electronic device carriers. More specifically, it relates to a personal e-port apparatus.

BACKGROUND OF THE INVENTION

Consumers have many electronic devices such as cell phones, electronic tablets, game consoles, personal digital/data assistants (PDAs) that are carried and include batteries.

There are several problems associated with carrying such devices. One problem is that it is difficult to organize such devices. Another problem is that is difficult to carry chargers for such devices. Another problem is that it is difficult to protect such devices.

Thus, it would be desirable to solve some of the problems associated with carrying multiple electronic devices.

SUMMARY OF THE INVENTION

In accordance with preferred embodiments of the invention, some of the problems associated with carrying multiple electronic devices are overcome.

A persona e-port apparatus is presented The personal e-port apparatus includes a portable apparatus such as bag, purse, backpack, etc. with specific portions for protecting, organizing displaying and charging plural electronic devices such as smart phones, book readers, game consoles and tablet computers.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a personal e-port apparatus in a mail bag in a closed position;

FIG. 3 is a block diagram illustrating the personal e-port apparatus from FIG. 2 in an open position.

DETAILED DESCRIPTION OF THE INVENTION

Figure 1:
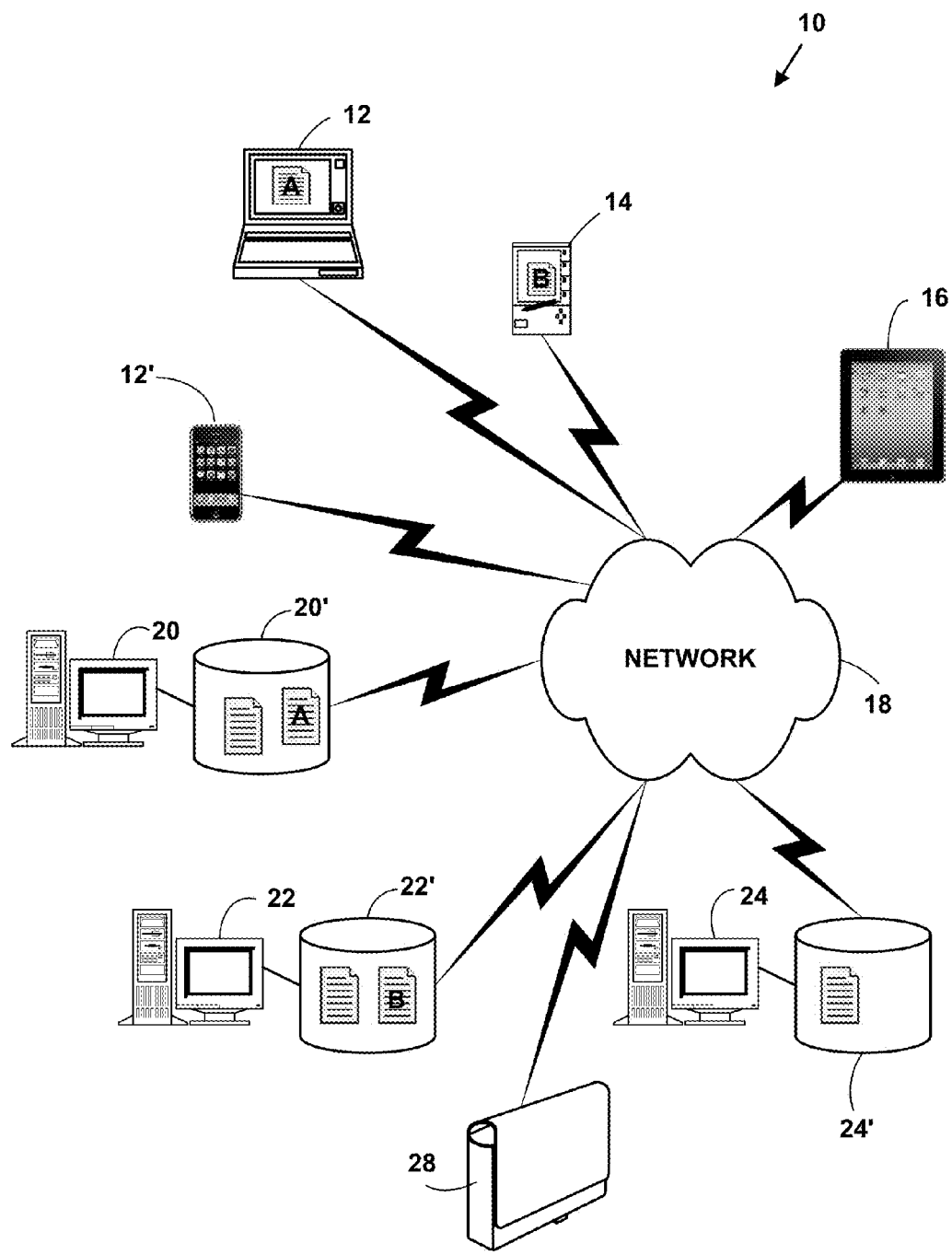
FIG. 1 is a block diagram an electronic communications system.

FIG. 1 is a block diagram illustrating an exemplary electronic communications system 10. The exemplary electronic communications system 10 includes, but is not limited to, one or more target network devices 12, 14, 16 (only three of which are illustrated) each with one or more processors.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), digital music players (e.g., iPods by Apple, other MP3 players, etc.) book readers (e.g., AMAZON KINDLE, NOOK, etc.) cable television (CATV) set-top boxes, satellite television boxes, digital televisions including high definition television (HDTV), three-dimensional (3D) televisions and other types of network devices.

The one or more target network devices 12, 14, 16 also include smart phones (e.g., 12', etc.) such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more target network devices 12, 14, 16 also include tablet computers (e.g., 16, etc.) such as the iPad, by Apple, Inc., the HP Tablet, by Hewlett Packard, Inc., the Playbook, by RIM, Inc., the Tablet, by Sony, Inc.

The target network devices 12, 14, 16 are in communications with a communications network 18. The communications network 18 includes, but is not limited to, a cloud computing network 18 including one or more portions of the Internet, an intranet, a wired Local Area Network (LAN), a wireless LAN (WiLAN), a Wide Area Network (WAN), a Metropolitan Area Network (MAN), Public Switched Telephone Network (PSTN) and other types of wired and wireless communications networks providing voice, video and data communications with wired or wireless communication protocols.

Plural server network devices (source network devices) 20, 22, 24 (only three of which are illustrated) each with one or more processors include one or more associated databases 20', 22', 24'. The plural source network devices 20, 22, 24 are in communications with the one or more target network devices 12, 14, 16 via the communications network 18. The plural source network devices 20, 22, 24, include, but are not limited to, electronic mail (e-mail) servers, World Wide Web servers, Internet servers, file servers, other types of electronic information servers, and other types of server network devices (e.g., edge servers, firewalls, routers, gateways, switches, etc.).

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

The one or more target network devices 12, 14, 16 and one or more server network devices 20, 22, 24 may communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, or the ADSL Forum. However, network devices based on other standards could also be used.

A non-mobile target network device (e.g., a payphone, etc.), includes a smart chip with plural software modules in communications with the communications network 18. In one embodiment the smart chip is programmed specifically for a home geographic area for the target network device. In another embodiment, the target network device is mobile. As the target network device is moved to a new geographic area, the smart chip communicates with the communications network 18 to receive dynamic advertising information that is based on the geographic area.

The communications network 18 may also include one or more servers or access points (AP) including wired and wireless access points (WAP) (not illustrated).

The communications network 18 includes data networks using the Transmission Control Protocol (TCP), User Datagram Protocol (UDP), Internet Protocol (IP) and other data protocols.

The communications network 18 may also include wired interfaces connecting portions of a PSTN or cable television network that connect the network devices 12, 14, 16 via one or more twisted pairs of copper wires, coaxial cable, fiber optic cable, other connection media or other connection interfaces. The PSTN is any public switched telephone network provided by AT&T, GTE, Sprint, MCI, SBC, Verizon and others.

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory ("RAM")) or non-volatile (e.g., Read-Only Memory ("ROM")) mass storage system readable by the CPU. The non-transitory computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building- and relying-upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

In one embodiment of the present invention, the wired and wireless interfaces include wired and wireless interfaces and corresponding networking protocols for wired connections to the communications network 18 including, a Public Switched Telephone Network (PSTN) or a cable television network (CATV) including HDTV that connect the target network devices 12, 14, 16 via one or more twisted pairs of copper wires, digital subscriber lines (e.g. DSL, ADSL, VDSL, etc.) coaxial cable, fiber optic cable, other connection media or other wired connection interfaces. The PSTN is any public switched telephone network provided by AT&T, GTE, Sprint, MCI, SBC, Verizon and others.

The communications network 18 may also include a paging and wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network or other types of computer networks.

The wireless cellular telephone network includes, but is not limited to Code Division Multiple Access (CDMA), Time Division Multiple Access (TDMA), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, fax, caller ID, Internet access, and e-mail.

As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network (PCN) includes various types of packetized cellular data.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (WiFi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the target network devices 14, 16 include a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, WiFi is a type of 802.11xx interface, whether 802.11b, 802.11a, dual-band, etc. WiFi devices include an RF interfaces such as 2.4 GHz for 802.11b or 802.11g and 5 GHz for 802.11a.

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide Wireless Link Prioritization (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can also be used to provide WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The target devices 12, 14, 16 include a protocol stack with multiple layers based on the Internet Protocol or OSI reference model. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated February 1998, September 1999, November 2000 and July 2003 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated February 1998 and March 2002 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Security and Encryption

Devices 12, 14, 16, 20, 22, 24, 28 and interfaces 44 of the present invention include plural security and/or encryption methods for secure communications via the computer network 18.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Personal E-Port Apparatus

FIG. 2 is a block diagram 26 illustrating a personal e-port apparatus 28 in a mail bag in a closed position.

FIG. 3 is a block diagram 30 illustrating the personal e-port apparatus 28 from FIG. 2 in an open position.

The personal e-port apparatus includes an exterior shell component 32, plural organizing components 34, plural power connecting components 36, one or more charging components 38, one or more power sources 40 and one or more mounting components 42. However, the present invention is not limited to this embodiment and more, fewer or other components can be used to practice the invention.

The exterior shell component 32, includes a bag, purse, backpack, suitcase, and/or other flexible and/or rigid container. The exterior shell component 32 comprises, various synthetic fiber fabrics (e.g., nylon, etc.) propylene based materials, wood, natural fiber fabrics (e.g., cotton, wool, silk, etc.), composite materials, hard and soft plastics, etc. However, the present invention is not limited to these exterior shell portions and more fewer and/or other exterior shell portions 32 can be used to practice the invention.

In one embodiment, the exterior shell component 32 is created from a rigid plastic including Polyetherimide, Polyimide other thermosetting polyimides, other plastics and/or composite materials.

However, the present invention is not limited to these materials and other materials can be used for the rigid fluid collection portion 14 to practice the invention.

"Polyetherimide" (PEI) is an amorphous, amber-to-transparent thermoplastic with characteristics similar to the related plastic PEEK. Polyether ether ketone (PEEK) is a colorless organic polymer thermoplastic Relative to PEEK, PEI is cheaper, but less temperature-resistant and lower in impact strength.

For example, commercially, ULTEM is a family of PEI products manufactured by SABIC. ULTEM resins are used in medical and chemical instrumentation due to their heat resistance, solvent resistance and flame resistance.

"Polyimide" (PI) is a polymer of imide monomers. Such imide monomers include pyromellitic dianhydride and 4,4'-oxydianiline and others. Polyimide materials are lightweight, flexible, resistant to heat and chemicals. Polyimide parts are not affected by commonly used solvents and oils, including hydrocarbons, esters, ethers, alcohols and freons. They also resist weak acids.

"Thermosetting polyimides" are known for thermal stability, good chemical resistance, excellent mechanical properties. Normal operating temperatures for such polymides range from cryogenic with temperatures below about −238° F. (−150° C.) to those exceeding about 500° F. (260° C.).

"Composite materials" are engineered or naturally occurring materials made from two or more constituent materials with significantly different physical or chemical properties which remain separate and distinct at the macroscopic or microscopic scale within the finished structure. Common polymer-based composite materials, include at least two parts, a substrate (e.g., fibers, etc.) and a resin.

The composite materials include "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

However, the present invention is not limited to these materials and other materials can be used to practice the invention.

In one embodiment, exterior shell component 32 is constructed from PolyVinyl Chloride (PVC) polyethylene, polypropylene, very low-density polyethylene (VLDPE), linear low-density polyethylene (LLDPE) Flexible polypropylene (FPP), Ethylene interpolymer alloy (EIA), EPDM (ethylene propylene diene monomer), composite materials and/or other flexible materials. However, the present invention is not limited to these materials and other materials can be used to practice the invention.

Polyvinyl chloride (PVC) is durable, cheap, and easily worked into membranes. Polyvinyl chloride is produced by polymerization of a monomer, vinyl chloride (VCM). PVC's are relatively low cost, biological and chemical resistance and very workable into membranes.

Very low-density polyethylene (VLDPE) and linear low-density polyethylene (LLDPE) overcome the shortcomings of other polyethylenes (e.g., high density polyethylene (HDPE), etc. in terms of flexibility. These are less crystalline forms of polyethylene which result in increased flexibility and a membrane less conducive to brittle stress cracking.

Flexible polypropylene (FPP) is produced in both unreinforced (PPU) and reinforced (PPR) form to provide a choice in terms of tensile behavior.

Ethylene interpolymer alloy (EIA) is an alloy of PVC resin with a special ethylene interpolymer that results in a flexible plastic-free material. EIA geomembranes maintain the advantages of PVC but have a high degree of durability and chemical resistance.

EPDM (ethylene propylene diene monomer) was developed from butyl rubber and exhibits excellent elongation characteristics.

However, the present invention is not limited to these materials and other materials can be used to practice the invention.

In one embodiment, the exterior shell component 32 includes backpacks with Polyurethane coated CORDURA Nylon.

CORDURA is the brand name for a collection of fabrics used in a wide array of products including luggage, backpacks, pants, military wear and performance apparel. CORDURA fabrics are known for their durability and resistance to abrasions, tears and scuffs. CORDURA fabrics are made using yarns or fibers. Fabrics can be made using 100% synthetic fiber or in blends with cotton or other natural fibers.

Nylon is a generic designation for a family of synthetic polymers known generically as aliphatic polyamides. Nylon is one of the most commonly used polymers. Key representatives are nylon-6,6 nylon-6; nylon-6,9; nylon-6,10; nylon-6,12; nylon-11; nylon-12 and nylon-4,6.

However, the present invention is not limited to these materials and other materials can be used to practice the invention.

The organizing component 34 include plural pockets and/or compartments of varying sizes and shapes. The plural pockets and/or compartments include flaps and/or zippers and/or hook and loop fasteners (e.g., VELCRO, etc.) to cover the plural pockets and/or compartments.

The plural organizing components 34 include organizing components for target network devices 12, 14, 16, including, but not limited to, smart phones, tablet computers, portable game consoles, digital cameras and digital music players. FIG. 3 illustrates smart phone 12' inside one of the plural organizing components.

In one embodiment, the plural organizing components 34 include selected ones of the plural organizing components 34 including viewing windows 35 (only one of which is illustrated in FIG. 3) comprising a portion of the organizing component allowing display of a target network device 12 when it is placed within a selected organizing components.

The plural organizing components 34 also prevent damage and scratching of the display and other surfaces of the target network device 12, 14, 16.

However, the present invention is not limited to these organizing components and more fewer and other types of organizing components 34 can be used to practice the invention.

The power connection components 36 include USB ports, DC power ports and AC power ports to connect target devices 12, 14, 16 for recharging. The plural power connection components 36 are illustrated as USB ports only in FIG. 3 for simplicity.

However, the present invention is not limited to these power connecting components 36 and more fewer and other types of power connecting components 36 can be used to practice the invention.

Universal Serial Bus (USB) is an industry standard developed in the mid-1990s that defines the cables, connectors and communications protocols used in a bus for connection, communication, and power supply between computers and electronic devices.

USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smart phones, PDAs, table computers, video game consoles, etc.

Direct Current (DC) is the unidirectional flow of electric charge. Direct current is produced by sources such as batteries, thermocouples, solar cells, and commutator-type electric machines of the dynamo type. Direct current may flow in a conductor such as a wire, but can also flow through semiconductors, insulators, or even through a vacuum as in electron or ion beams. The electric current flows in a constant direction, distinguishing it from Alternating Current (AC).

Alternating Current (AC) is the flow of an electric charge periodically reverses direction. In DC, the flow of electric charge is only in one direction. AC is the form in which electric power is delivered to businesses and residences. The usual waveform of an AC power circuit is a sine wave.

The charging components 38 include USB, AC, DC including but not limited to batteries, capacitors, solar cells, induction charging bases and/or universal adaptability charging attachments.

However, the present invention is not limited to these charging components 38 and more fewer and other types of charging components 38 can be used to practice the invention.

In one embodiment, the charging component 38 includes one or more capacitors. A "capacitor" is a passive two-terminal electrical component used to store energy electrostatically in an electric field. The forms of practical capacitors vary widely, but all contain at least two electrical conductors (plates) separated by a dielectric (i.e., insulator). The conductors can be thin films of metal, aluminum foil or disks, etc. The "nonconducting" dielectric acts to increase the capacitor's charge capacity. A dielectric can be glass, ceramic, plastic film, air, paper, mica, etc. Capacitors are widely used as parts of electrical circuits in many common electrical devices. Unlike a resistor, a capacitor does not dissipate energy. Instead, a capacitor stores energy in the form of an electrostatic field between its plates.

In one embodiment, the charging component 38 includes one or more solar cells. A "solar cell" (also called a photovoltaic cell) is an electrical device that converts the energy of light directly into electricity by the photovoltaic effect. It is a form of photoelectric cell in that its electrical characteristics (e.g., current, voltage, or resistance vary when light is incident upon it, etc.) which, when exposed to light, can generate and support an electric current without being attached to any external voltage source, but do require an external load for power consumption.

In one embodiment, the charging component 38 includes a flexible "inductive" charging mat. Inductive charging (also known as "wireless charging") uses an electromagnetic field to transfer energy between two objects. Energy is sent through an inductive coupling to an electrical device 12, 14, 16, which can then use that energy to charge batteries or run the device.

Induction chargers typically use an induction coil to create an alternating electromagnetic field from within a charging base station, and a second induction coil in the portable device takes power from the electromagnetic field and converts it back into electrical current to charge the battery. The two induction coils in proximity combine to form an electrical transformer.

Newer approaches to induction chargers reduce transfer losses through the use of ultra thin coils, higher frequencies, and optimized drive electronics. This results in more efficient and compact chargers and receivers, facilitating their integration into mobile devices or batteries with minimal changes required. These technologies provide charging times comparable to wired approaches, and they are rapidly finding their way into mobile devices. For example, a new induction recharger system employs high-frequency induction to deliver high power at an efficiency of 86% (6.6 kW power delivery from a 7.68 kW power draw).

In another embodiment, the induction mat is removable and re-attachable to the exterior shell 32 of the apparatus 28 and is placed within an inner surface of the exterior shell 32 (FIG. 3).

In another embodiment, a target network device is placed inside an organizing component 34 (FIG. 3) and is charged by the induction mat 38 by being in close proximity, but not directly on, the induction mat 38.

Figure 4:
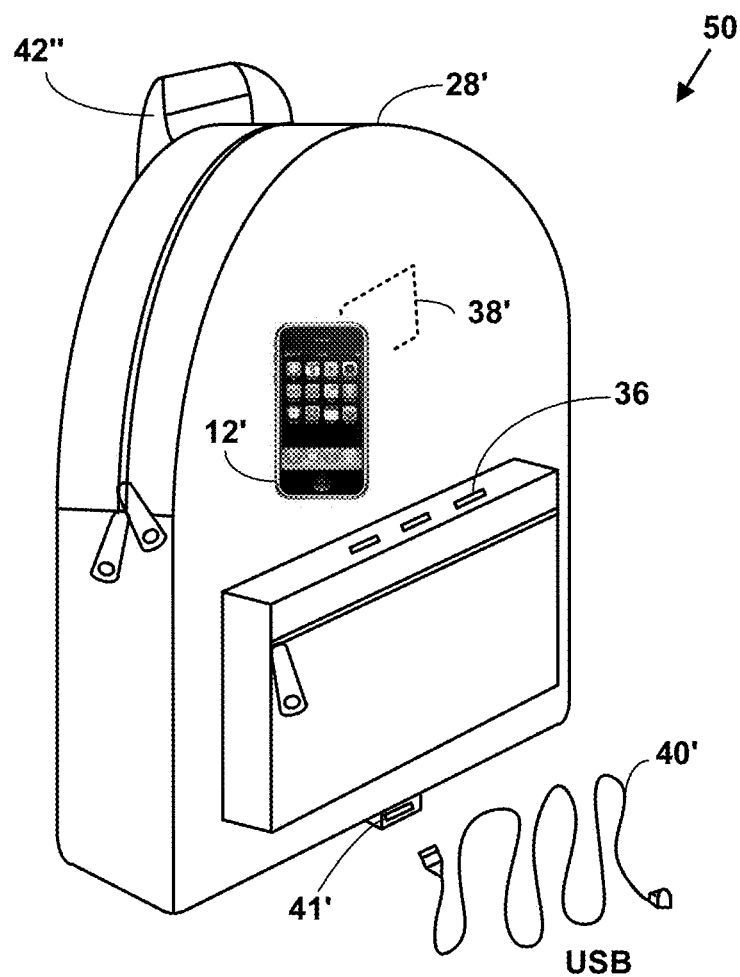
FIG. 4 is block diagram illustrating a personal e-port apparatus in a backpack.

In one embodiment, the induction mat is integral to an outer portion of the exterior shell 32 of the apparatus 28 (FIG. 4).

In one embodiment, a target network device 12 is placed on the induction mat 38' for charging (FIG. 4).

In one embodiment, the charging component 38 includes a "universally adaptable" charger component 34. A universally adaptable charger couples electrically a charger outlet to pairs of terminals of different types and kinds of rechargeable battery devices.

However, the present invention is not limited to these charging components 38 and more fewer and other types of charging components 38 can be used to practice the invention.

The power source component 40 with power source component interface 41 (e.g., plug, etc.) provides USB, AC, DC power to the apparatus 28 for the power connecting components 36 and the charging components 38. The plural power source components 40 is illustrated as an AC power source 40 only in FIG. 3 for simplicity.

However, the present invention is not limited to these power source components 40 and more fewer and other types of power source components 40 can be used to practice the invention.

The exterior shell 30 includes a mounting component 42 to attach the apparatus to any bathroom or kitchen counter, mattress, chair, sofa, table, door, airplane, train, ship or automotive seating or headrest including but not limited to, cushions/mattresses sleeping areas in the afore mentioned areas.

In one embodiment, the mounting component 42 includes a stand component (illustrated in FIG. 3) such as that would be used to hold a picture frame. In another embodiment, the mounting component 42 includes a strap component 42" (illustrated in FIG. 4), a clip component (not illustrated), a hook and loop component 42' (FIG. 3) (both not illustrated) and/or other types attachment components 42.

However, the present invention is not limited to these mounting components 42 and more fewer and other types of attachment components 42 can be used to practice the invention.

The apparatus 28 is portable and placed into a comfortable position on a bed, home, hotel, resort, hostel, sofa, chair, table, door, kitchen area, bathroom/washroom, airplane, train, automobile or ship/boat to protect, organize, use display and charge plural target network devices 12, 14, 16.

In one embodiment, the apparatus 28, further includes a wireless interface 44 component with one or more processors connected to the one or more power source components 40 for communicating with a wireless communications network 18. (The actual connections are not illustrated in FIG. 3 for simplicity), The wireless interface component 44, includes but is not limited to, an IEEE 802.11a, 802.11b, 802.11g, 802.11n, 802.15.4 (ZigBee), 802.16a, 802.16g, WiFi, WiMAX, HIPERMAN, RF Home, Bluetooth, infrared, NFC, and/or M2M wireless interfaces for communicating with the wireless communications network 18.

In one embodiment, the wireless interface component 44 provides wireless communications to target network devices 12, 14, 16, that may not have wireless communications capabilities.

In another embodiment, the wireless interface component 44 provides a wireless antenna booster to those target network devices that already have wireless communication capabilities.

In one embodiment, the wireless interface 44 provides secure wireless communications with the wireless communications network 18 with one or more of the security and/or encryption methods described herein.

However, the present invention is not limited to these wireless interface components 42 and more fewer and other types of wireless components 44 can be used to practice the invention.

In one embodiment, the apparatus 28 further includes one or more audio interface components 46 interface (e.g., speakers, etc.) connected to the one or more power source components 40. The actual connections are not illustrated in the drawings for simplicity. The audio speaker 46 (only one of which is illustrated) provide an audio for the one or more target network devices 12, 14, 16.

However, the present invention is not limited to these audio interface components 46 and more fewer and other types of audio interface components 46 can be used to practice the invention.

In one embodiment, the apparatus 28 further includes one or more display interface components 48 connected to the one or more power source components 40. The actual connections are not illustrated in the drawings for simplicity. The display components provide an visual interface (e.g., display screen, etc.) for the one or more target network devices 12, 14, 16.

In one embodiment, the one or more display interface components 48 include, but are not limited to, a liquid-crystal display (LCD). An LCD is a flat panel display, electronic visual display, or video display that uses the light modulating properties of liquid crystals. Liquid crystals do not emit light directly. An LCD's low electrical power consumption enables it to be used in battery-powered electronic equipment. It is an electronically modulated optical device made up of any number of segments filled with liquid crystals and arrayed in front of a light source (backlight) or reflector to produce images in color or monochrome.

In one embodiment, the one or more display interface components 48 include, but are not limited to, a thin-film-transistor liquid-crystal display (TFT LCD). A TFT LCD is a variant of an LCD that uses thin-film transistor (TFT) technology to improve image qualities such as addressability and contrast. A TFT LCD is an active-matrix LCD, in contrast to passive-matrix LCDs or simple, direct-driven LCDs with a few segments.

However, the present invention is not limited to these display components 46 and more fewer and other types of display components 48 can be used to practice the invention.

In addition, the present invention is not limited to the physical placement of any of the components 38, 41, 42, 44, 46, 48 described in the outer shell as illustrated in the drawings. The placement in the outer shell 32 is exemplary only and does not limit the invention.

FIG. 4 is block diagram 50 illustrating a personal e-port apparatus 28 in a backpack 28'. FIG. 4 illustrates a target network device 12' placed on a flexible inductive charging mat 38' integral to the outer shell 30' of the backpack 28' for recharging. FIG. 4 also illustrates a USB power source 40' with USB power source interface 41' and mounting component 42 includes a strap 42'.

The apparatus 28 adds comfort and convenience to an individual, couple or group for social, personal, entertainment or work time while using any handheld device, book reader, smart book reader, e-books, remote controls, game controls or personal items. The device is comprised of an exterior shell (made of fabrics, propylene based materials, wood, natural fibers, plastics, etc.) that houses areas for storage, recharging component's (battery cells, ac/dc adaption, solar, USB ports, charging bases and/or universal adaptability attachments).

Other features of the apparatus 28 include but are not limited to, the color, material or amount of adaptable charging units of the exterior and interior shell. Construction of the exterior shell riveted, stitched, heat sealed, sonic welded or solvent sealed/welded construction of the exterior shell.

The personal e-port apparatus 28 described herein includes a portable apparatus such as bag, purse, backpack, etc. with specific portions for protecting, organizing displaying and charging plural electronic devices such as smart phones, book readers, game consoles and tablet computers It should be understood that the architecture, materials, components, programs, processes, methods and systems described herein are not related or limited to any particular type of materials, network device or network system (hardware or software), unless indicated otherwise. Various types of general purpose or specialized materials and network systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A personal e-port apparatus, comprising in combination:
an exterior shell component for carrying one or more objects with a plurality of organizing components with a plurality of sizes and shapes;
the plurality of organizing components including a plurality of pockets and compartments;
a plurality of power connection components integral to the exterior shell component for connecting to one or more target network devices each with one or more processors to the personal e-port apparatus;
one or more charging components connected to and providing power to the plurality of power connection components including a flexible induction charging mat integral to the exterior shell component;
one or more power source components;
one or more mounting components connected to the exterior shell for mounting the personal e-port apparatus to one or more other fixed or movable objects; and
a wireless interface component with one or more processors connected to the one or more power source components for communicating with a wireless communications network, wherein the wireless interface component provides wireless communications with the wireless communications network, wherein the wireless interface component provides wireless communications capabilities to target network devices that do not have wireless communication capabilities, and wherein the wireless interface component provides a wireless antenna booster to other target network devices that already have wireless communication capabilities.

2. The personal e-port apparatus of claim 1 wherein the exterior shell component includes synthetic fiber fabrics, natural fiber fabrics composite materials, hard plastics, soft plastics and combinations thereof.

3. The personal e-port apparatus of claim 1 wherein the plurality of organizing components include a plurality of organizing components for a plurality of target network devices including smart phones, tablet computers, book readers, portable game consoles, digital cameras and digital music players.

4. The personal e-port apparatus of claim 1 wherein the plurality of power connection components include Universal Serial Bus (USB), Direct Current (DC) and Alternating Current (AC) power connection components.

5. The personal e-port apparatus of claim 1 wherein the one or more charging components include Universal Serial Bus (USB) charging components, Alternating Current (AC) charging components, Direct Current (DC) charging components comprising: batteries, capacitors, solar cells and induction charging components.

6. The personal e-port apparatus of claim 1 wherein the one or more target network devices include one or more laptop computers, tablet computers, mobile phones, smart phones, Internet appliances, personal digital-data assistants (PDA), digital cameras, portable game consoles, digital music players or book readers.

7. The personal e-port apparatus of claim 5 wherein the induction charging components include a flexible induction charging mat removable from and re-attachable to the exterior shell component.

8. The personal e-port apparatus of claim 1 wherein one or more power source components include Universal Serial Bus (USB), Direct Current (DC) and Alternating Current (AC) power source components.

9. The personal e-port apparatus of claim 1 further comprising the wireless interface component with the one or more processors connected to the exterior shell component and to the one or more power source components for communicating with the wireless communications network.

10. The personal e-port apparatus of claim 1 wherein the wireless interface component comprises an IEEE 802.11a, 802.11b, 802.11g, 802.11n, 802.15.4 (ZigBee), 802.16a, 802.16g, Wireless Fidelity (WiFi), Worldwide Interoperability for Microwave Access" (WiMAX), ETSI High Performance Radio Metropolitan Area Network (HIPERMAN), RF Home, Bluetooth, infrared, near field communications (NFC) and machine-to-machine (M2M) wireless interface for communicating with the wireless communications network.

11. The personal e-port apparatus of claim 1 wherein the wireless communications network includes an IEEE 802.15.4 (ZigBee), Bluetooth, infrared, near field communications (NFC) or machine-to-machine (M2M) wireless communications network.

12. The personal e-port apparatus of claim 1 wherein the wireless communications network includes a wireless personal area network (WPAN).

13. The personal e-port apparatus of claim 1 further comprising a wired interface component for secure communications with a wired communications network.

14. The personal e-port apparatus of claim 1 further comprising one or more audio interface components connected to the one or more power source components.

15. The personal e-port apparatus of claim 1 further comprising one or more display interface components connected to the one or more power source components.

16. The personal e-port apparatus of claim 15 wherein the one or more display interface components include one or more liquid-crystal display (LCD) or thin-film-transistor (TFT) LCD display components.

17. The personal e-port apparatus of claim 1 wherein the one or more mounting components mount the e-port apparatus to a bathroom or kitchen counter, mattress, chair, sofa, table, door, airplane, train, ship or automotive seat or headrest.

18. The personal e-port apparatus of claim 1 wherein the one or more mounting components include a stand component, a strap component, a clip component or a hook and loop component.

19. The personal e-port apparatus of claim 1 wherein the one or more mounting components attach the personal e-port apparatus to a fixed or moveable object and display and charge the one or more target network devices and allow access to the one or more target network devices included within the personal e-port apparatus.

20. A personal e-port apparatus system, comprising in combination:
a wireless communications network;
one or more target network devices each with one or more processors;
a personal e-port apparatus comprising:
an exterior shell component for carrying one or more objects with a plurality of organizing components with a plurality of sizes and shapes;
the plurality of organizing components including a plurality of pockets and compartments;
a plurality of power connection components integral to the exterior shell component for connecting the one or more target network devices to the personal e-port apparatus;
one or more charging components connected to and providing power to the plurality of power connection components, wherein the one or more charging components include a flexible induction charging mat integral to the exterior shell component;
one or more power source components;
one or more mounting components connected to the exterior shell for mounting the personal e-port apparatus to one or more other fixed or movable objects; and
a wireless interface component with one or more processors connected to the one or more power source components for communicating with the wireless communications network, wherein the wireless interface component includes secure communications with the wireless communications network, wherein the wireless interface component provides wireless communications capabilities to target network devices that do not have wireless communication capabilities, and wherein the wireless interface component provides a wireless antenna booster to target network devices that already have wireless communication capabilities.

21. The personal e-port apparatus system of claim 20 wherein the wireless interface component also provides non-secure communications with the wireless communications network.

* * * * *